(12) United States Patent
Miyao et al.

(10) Patent No.: US 12,287,482 B2
(45) Date of Patent: Apr. 29, 2025

(54) VIRTUAL IMAGE DISPLAY APPARATUS

(71) Applicant: SEIKO EPSON CORPORATION, Tokyo (JP)

(72) Inventors: Toshiaki Miyao, Chino (JP); Toshiyuki Noguchi, Shiojiri (JP); Kunihiko Yano, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 516 days.

(21) Appl. No.: 17/708,249

(22) Filed: Mar. 30, 2022

(65) Prior Publication Data

US 2022/0326525 A1 Oct. 13, 2022

(30) Foreign Application Priority Data

Mar. 31, 2021 (JP) .................. 2021-059381

(51) Int. Cl.
G02B 27/01 (2006.01)
G02B 5/02 (2006.01)
G02B 5/08 (2006.01)

(52) U.S. Cl.
CPC ....... G02B 27/0172 (2013.01); G02B 5/0289 (2013.01); G02B 5/0816 (2013.01); G02B 2027/0178 (2013.01)

(58) Field of Classification Search
CPC .............. G02B 27/0172; G02B 5/0289; G02B 5/0816; G02B 2027/0178; G02B 2027/013; G02B 5/26; G02B 2027/0174; G02B 27/017; G02B 27/0176; G02B 27/01; G02B 27/0101

See application file for complete search history.

(56) References Cited

U.S. PATENT DOCUMENTS

| | | | |
|---|---|---|---|
| 2010/0149073 A1* | 6/2010 | Chaum | G02B 27/0075 345/8 |
| 2012/0236046 A1 | 9/2012 | Sugiyama et al. | |
| 2016/0154244 A1* | 6/2016 | Border | H05B 45/12 359/630 |

(Continued)

FOREIGN PATENT DOCUMENTS

| | | |
|---|---|---|
| CN | 102320164 A | 1/2012 |
| CN | 112444991 A | 3/2021 |

(Continued)

*Primary Examiner* — Darryl J Collins
*Assistant Examiner* — Matthew Y Lee
(74) *Attorney, Agent, or Firm* — Oliff PLC

(57) ABSTRACT

A virtual image display apparatus includes an image light emitting unit configured to emit image light, and a see-through mirror which is an optical member having a reflective film that reflects the image light, wherein the see-through mirror includes a first region on which a light ray of the image light corresponding to a center angle of view is incident and a second region on which a light ray of the image light which different from the light ray corresponding to the center angle of view is incident, a film thickness in the first region of the reflective film is thicker than a film thickness in the second region, and the first region of the reflective film has reflectivity characteristics corresponding to a wavelength band which is wider toward the long wavelength side than a wavelength band of the image light emitted from the image light emitting unit.

7 Claims, 11 Drawing Sheets

(56) References Cited

U.S. PATENT DOCUMENTS

| | | | |
|---|---|---|---|
| 2016/0223818 A1* | 8/2016 | Tasaka | G02B 27/0176 |
| 2016/0341965 A1* | 11/2016 | Saigo | G02B 5/285 |
| 2017/0235030 A1* | 8/2017 | Tanaka | B60K 35/00 |
| | | | 349/11 |
| 2018/0067314 A1* | 3/2018 | Nortrup | G02B 27/0093 |
| 2019/0278085 A1 | 9/2019 | Ito | |
| 2020/0050008 A1* | 2/2020 | Seo | G02B 27/144 |
| 2020/0073127 A1* | 3/2020 | Takeda | G02B 27/0101 |
| 2021/0063749 A1 | 3/2021 | Takeda et al. | |
| 2021/0063752 A1* | 3/2021 | Takeda | G02B 27/0172 |

FOREIGN PATENT DOCUMENTS

| | | |
|---|---|---|
| JP | S58-181004 A | 10/1983 |
| JP | 2002-189101 A | 7/2002 |
| JP | 2006-058023 A | 3/2006 |
| JP | 2019-159038 A | 9/2019 |
| WO | 2012/042744 A1 | 4/2012 |

\* cited by examiner

VIRTUAL IMAGE DISPLAY APPARATUS

The present application is based on, and claims priority from JP Application Serial Number 2021-059381, filed Mar. 31, 2021, the disclosure of which is hereby incorporated by reference herein in its entirety.

BACKGROUND

1. Technical Field

The present disclosure relates to a virtual image display apparatus which enables observation of a virtual image and is applied as, for example, a head-mounted display or the like.

2. Related Art

An image display apparatus that includes a curved surface combiner configured of a semi-transmissive concave mirror which transmits some of an incident luminous flux, reflects the rest thereof and reflects a luminous flux of an image with the curved surface combiner, and allows a user to observe a virtual image is known as an image display apparatus (refer to JP-A-2019-159038). In this case, some light incident from the outside is transmitted through the curved surface combiner.

In order to create the curved surface combiner in the image display apparatus of JP-A-2019-159038, for example, when a film having a property of transmitting some of an incident luminous flux and reflecting the rest is formed on a curved surface, a difference in a film thickness occurs between the center side and the peripheral side of the curved surface at the time of forming the film, desired reflection transmission characteristics are not obtained, and thus good image formation may not be possible.

SUMMARY

A virtual image display apparatus according to an aspect of the present disclosure includes: an image light emitting unit that emits image light, and an optical member having a reflective film which reflects the image light, the reflective film including a first region on which a light ray of the image light corresponding to a center angle of view is incident and a second region on which light rays of the image light which are different from the light ray corresponding to the center angle of view are incident, a film thickness in the first region of the reflective film is thicker than a film thickness in the second region, and the first region of the reflective film has reflectivity characteristics corresponding to a wavelength band which is wider toward the long wavelength side than a wavelength band of the image light.

DESCRIPTION OF EXEMPLARY EMBODIMENTS

First Embodiment

Hereinafter, a structure, an operation, and the like of an image display apparatus will be described as an example of a virtual image display apparatus according to the present disclosure with reference to FIG. 1 and the like.

Figure 1:
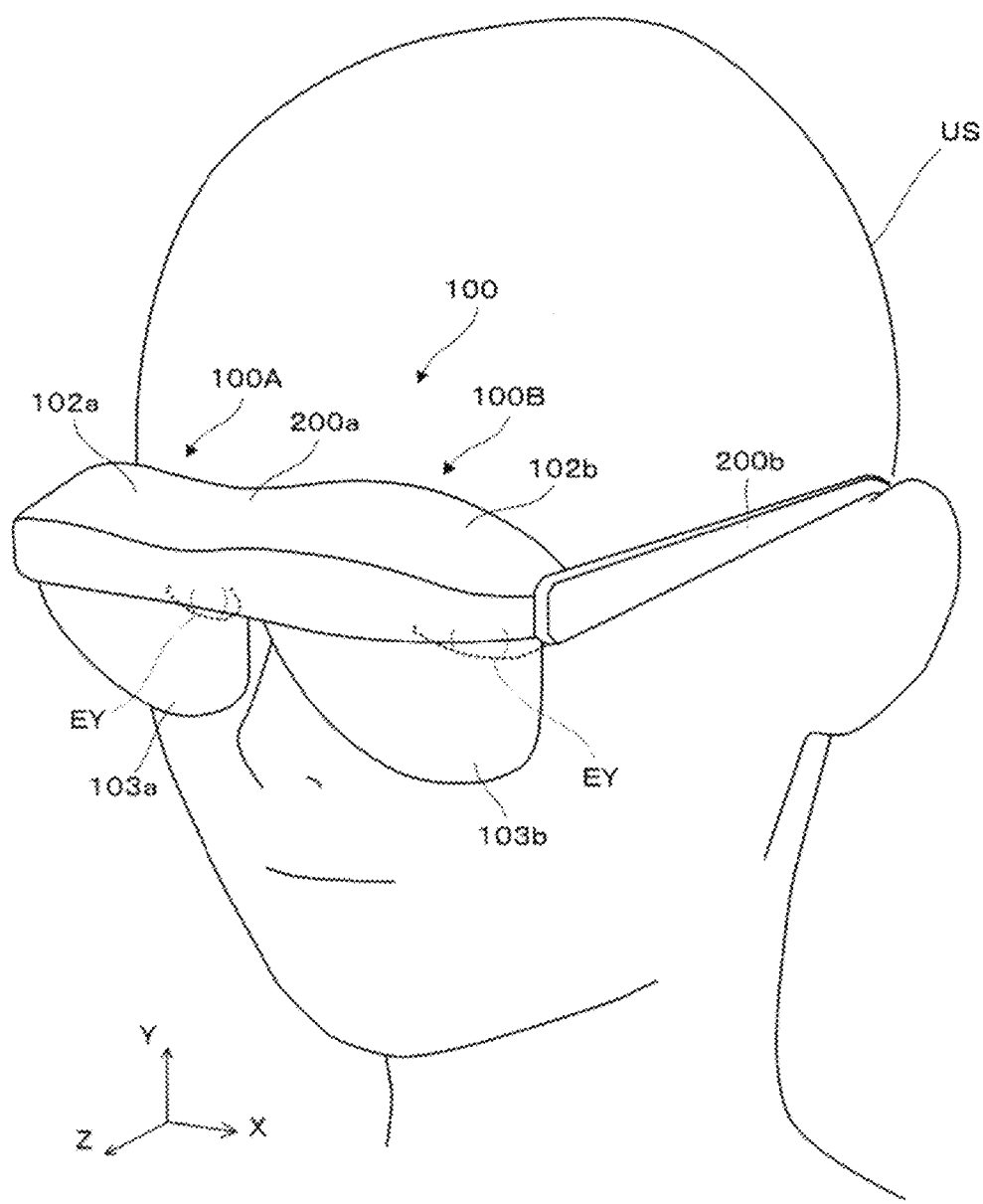
FIG. 1 is an external perspective view illustrating an example of an image display apparatus of a first embodiment.

FIG. 1 is a view illustrating a mounted state of an image display apparatus 100. The image display apparatus 100 is a head-mounted display and causes an observer or a wearer US who is wearing the head-mounted display to recognize a virtual image as an image. In FIG. 1 and the like, X, Y, and Z are an orthogonal coordinate system, a +X direction corresponds to a transverse direction in which both eyes EY of an observer or the wearer US who is wearing the image display apparatus 100 are arranged, a +Y direction corresponds to an upward direction orthogonal to the transverse direction in which the both eyes EY of the wearer US are arranged, and a +Z direction corresponds to a direction to the front or a forward direction for the wearer US. A ±Y direction is parallel to a vertical axis or a vertical direction.

The image display apparatus 100 includes a main body 200a disposed to cover the front of eyes of the wearer US and a pair of temple-shaped support devices 200b which support the main body 200a. In a functional point of view, the main body 200a includes a first display device 100A for the right eye and a second display device 100B for the left eye. The first display device 100A is constituted of an image light emitting unit 102a disposed at an upper portion thereof and a combiner 103a which has a spectacle lens shape and covers the front of the eye. Similarly, the second display device 100B is constituted of an image light emitting unit 102b disposed at an upper portion thereof and a combiner 103b which has a spectacle lens shape and covers the front of the eye.

Figure 2:
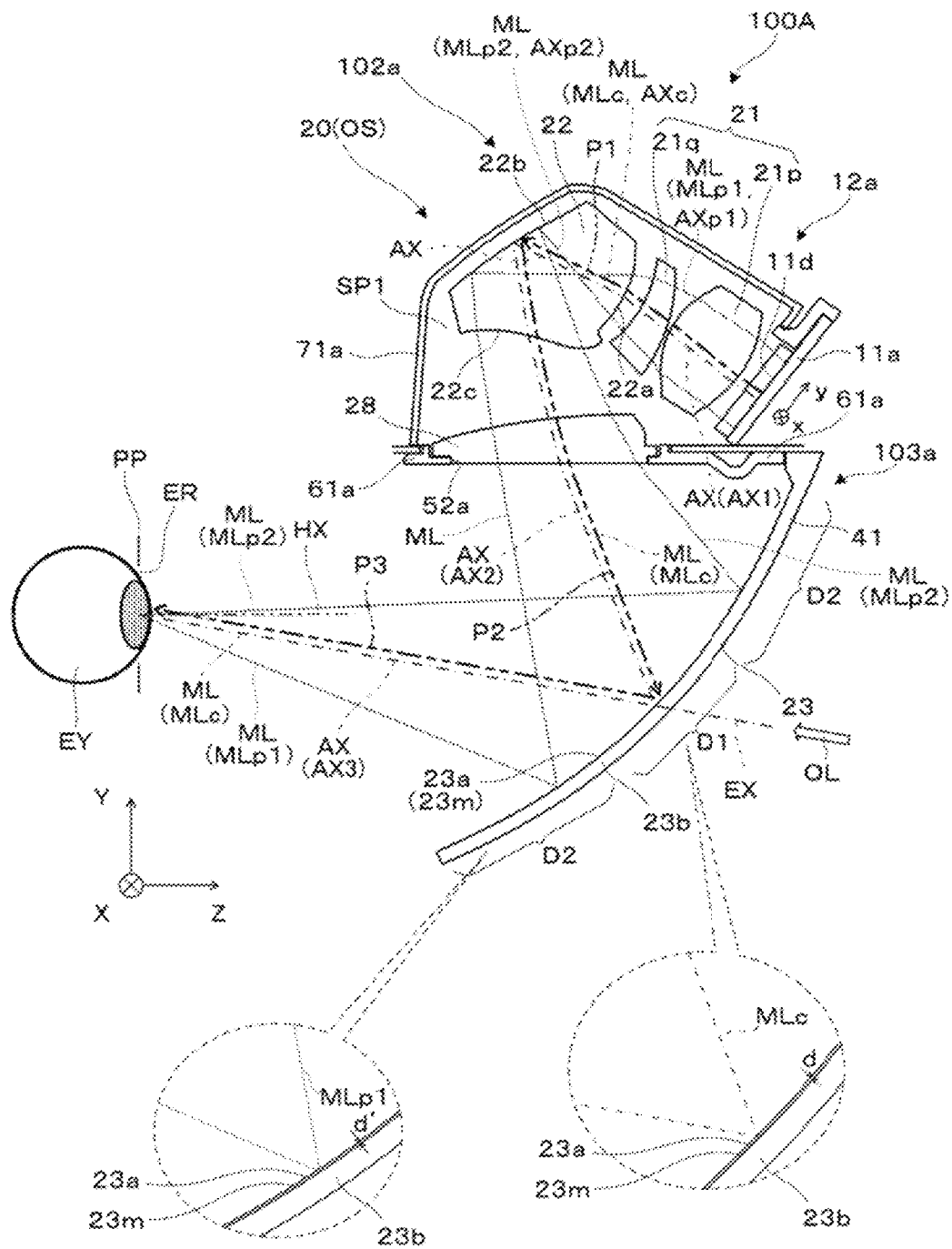
FIG. 2 is a conceptual side cross-sectional view illustrating an optical system inside the image display apparatus.

With reference to FIG. 2, among the parts of the image display apparatus 100, in particular, the parts having an optical function will be described. Of the bilateral symmetric first display device 100A and the second display device 100B (refer to FIG. 1) which constitute the image display apparatus 100, in the example of FIG. 2, the first display device 100A is illustrated as a representative. Here, an optical structure of the first display device 100A will be described with reference to the side cross-sectional view illustrated in FIG. 2. Since the second display device 100B for the left eye (refer to FIG. 1) is the same as the first display device 100A, detailed description and the like thereof will be omitted.

As illustrated in FIG. 2, the first display device 100A for the right eye includes a display element 11a and an imaging optical system 20 as parts having an optical function (optical units).

The imaging optical system 20 is also referred to as a light guide optical device. The imaging optical system 20 includes a projection lens 21 which is a projection optical system, a prism mirror 22, a plate-shaped optical element 28, and a see-through mirror 23. For example, the display element 11a, the projection lens 21, the prism mirror 22, and the plate-shaped optical element 28 correspond to the image light emitting unit 102a in FIG. 1, and the see-through mirror 23 corresponds to the first combiner 103a in FIG. 1. In other words, the image light emitting unit 102a emits image light ML, which is the image light, to the first combiner 103a. Further, the first combiner 103a reflects some of the image light ML, which is emitted from the image light emitting unit 102a and incident, to form an exit pupil.

The display element 11a is constituted of, for example, an organic light emitting diode (OLED) display, that is, an organic electro-luminescence (EL) display. Here, as an example, since the display element 11a is constituted of an OLED display, unpolarized light is emitted as the image light ML from a display surface 11d, that is, the display element 11a forms a color still image or moving image on the two-dimensional display surface 11d. The display element 11a is disposed along an X-Y plane which is inclined by being rotated about an X axis with respect to the X-Y plane. The display element 11a is driven by a control device (not illustrated) provided on a circuit board to perform a display operation. The display element 11a is not limited to the OLED display (the organic EL display) and may be replaced with a display device using a micro LED display, an inorganic EL, a laser array, a quantum dot light emitting element, or the like.

In the display element 11a and the imaging optical system 20, the projection lens 21 and the prism mirror 22 are fixed to a first frame 61a in a state in which they are aligned with each other by a frame (not illustrated), and are accommodated in a space SP1 between a first cover member 71a and the first frame 61a. The plate-shaped optical element 28 is disposed to be fitted into a stepped portion formed by an optical opening of the first frame 61a, and the periphery of the optical opening is kept in an airtight state.

The projection lens 21 causes the image light ML emitted from the display element 11a to pass therethrough and then to be incident on the prism mirror 22. The projection lens 21 focuses the image light ML emitted from the display element 11a into a state close to a parallel luminous flux. The projection lens 21 includes a first lens 21p and a second lens 21q. The prism mirror 22 has an inner reflection surface 22b and causes the image light ML emitted from the projection lens 21 to be incident on the inside from an incidence surface 22a, to be totally reflected by the inner reflection surface 22b and to be emitted from an emission surface 22c to the outside. At this time, the prism mirror 22 emits the image light ML incident from the front such that the image light ML is bent in a direction inclined with respect to a direction in which a direction of incidence is reversed (a direction of a light source seen from the prism mirror 22). The plate-shaped optical element 28 passes the image light ML emitted from the emission surface 22c of the prism mirror 22 while refracting the image light ML, and the see-through mirror 23 reflects the image light ML emitted from the prism mirror 22 toward a pupil position PP (a position of the exit pupil). The pupil position PP is a position at which the image light ML from each of points on the display surface 11d is incident to overlap from an angular direction corresponding to a position of each of the points on the display surface 11d in a predetermined divergent state or parallel state.

The see-through mirror 23 is a reflective optical member having a curved surface shape and has a reflective film 23m which reflects the image light ML. More specifically, the see-through mirror 23 is a curved plate-shaped optical member which serves as a concave surface mirror, and reflects the image light ML incident from the prism mirror 22 via the plate-shaped optical element 28 toward the pupil position PP by the reflective film 23m. The see-through mirror 23 covers the position of the exit pupil, that is, the pupil position PP at which the eye EY or the pupil is disposed, has a concave shape toward the pupil position PP, and has a convex shape toward the outside. The see-through mirror 23 is a mirror plate having a structure in which a reflective film 23m is formed on a surface of a plate-shaped body 23b. The reflective film 23m forming a reflection surface 23a of the see-through mirror 23 has transmissive properties. Outside light OL which has passed through the see-through mirror 23 is also incident on the pupil position PP. As described above, the reflective film 23m has partial transmissive properties, and the see-through mirror 23 which is an optical member is the combiner 103a which turns back some of the image light ML emitted from the image light emitting unit 102 in the reflective film 23m and transmits some of the outside light OL, and thus so-called see-through visual recognition is possible. In other words, the wearer US wearing the image display apparatus 100 can observe a virtual image of the image light ML in a state in which the virtual image overlaps an outside image.

The optical surfaces constituting the projection lens 21, the prism mirror 22, the plate-shaped optical element 28, and the see-through mirror 23 above include a free curved surface, and at least some of the optical surfaces can be replaced with an aspheric surface or a spherical surface.

The imaging optical system 20 is an off-axis optical system OS due to the see-through mirror 23 being a concave mirror or the like. In the case of the embodiment, the projection lens 21, the prism mirror 22, the plate-shaped optical element 28, and the see-through mirror 23 are disposed to be non-axisymmetric and have optical surfaces which are non-axisymmetric. In this imaging optical system 20, that is, the off-axis optical system OS, an optical axis AX is bent so that the optical axis AX extends along an off-axis surface (a surface parallel to a Y-Z plane) corresponding to a plane of the drawing. In this imaging optical system 20, the optical elements 21, 22, and 23 are arranged along the off-axis surface by bending the optical axis AX in the off-axis surface parallel to the Y-Z plane. The imaging optical system 20 includes optical axis portions AX1, AX2, and AX3 which are disposed along the off-axis surface (a surface parallel to the Y-Z plane) which is a reference surface extending in a longitudinal direction and are inclined with respect to each other before and after the reflection surface. The optical axis AX as a whole extends along an optical path of main light rays emitted from the center of the display element 11a and passes through the center of an eye ring ER or a pupil corresponding to an eye point. The optical axis AX is disposed in a Z shape by the plurality of optical axis portions AX1, AX2, and AX3 when seen in a transverse cross section parallel to the Y-Z plane. In other words, in the off-axis surface parallel to the Y-Z plane, an optical path P1 from the projection lens 21 to an inner reflection surface 22b, an optical path P2 from the inner reflection surface 22b to the see-through mirror 23, and an optical path P3 from the see-through mirror 23 to the pupil position PP are bent in a Z shape in two stages.

In the configuration described above, in the image light ML, a light ray (a central light ray) corresponding to a center angle of view is referred to as a light ray MLc, a light ray at the upper side of the angle of view among light rays which are different from the light ray corresponding to the center angle of view (ambient light rays) is referred to as a light ray MLp1, and a light ray at the lower side of the angle of view among the light rays which are different from the light ray corresponding to the center angle of view (the ambient light rays) is referred to as a light ray MLp2. In other words, a component emitted from a center position or a point substantially at the center on the display surface 11d of the display element 11a is referred to as a light ray MLc, and an optical axis corresponding to the light ray MLc is referred to as an optical axis portion AXc. A component emitted from a peripheral point on the upper side of the center position on the display surface 11d is referred to as a light ray MLp1, and an optical axis corresponding to the light ray MLp1 is referred to as an optical axis portion AXp1. In addition, a component emitted from a peripheral point on the lower side of the center position is referred to as a light ray MLp2, and an optical axis corresponding to the light ray MLp2 is referred to as an optical axis portion AXp2. In the drawing, the main light rays are illustrated as the light rays MLc, MLp1 and MLp2 which are representatives of the components. Thus, the optical axis portions AXc, AXp1, and AXp2 coincide with (or substantially coincide with) the light rays MLc, MLp1, and MLp2 in the drawing.

Figure 3:
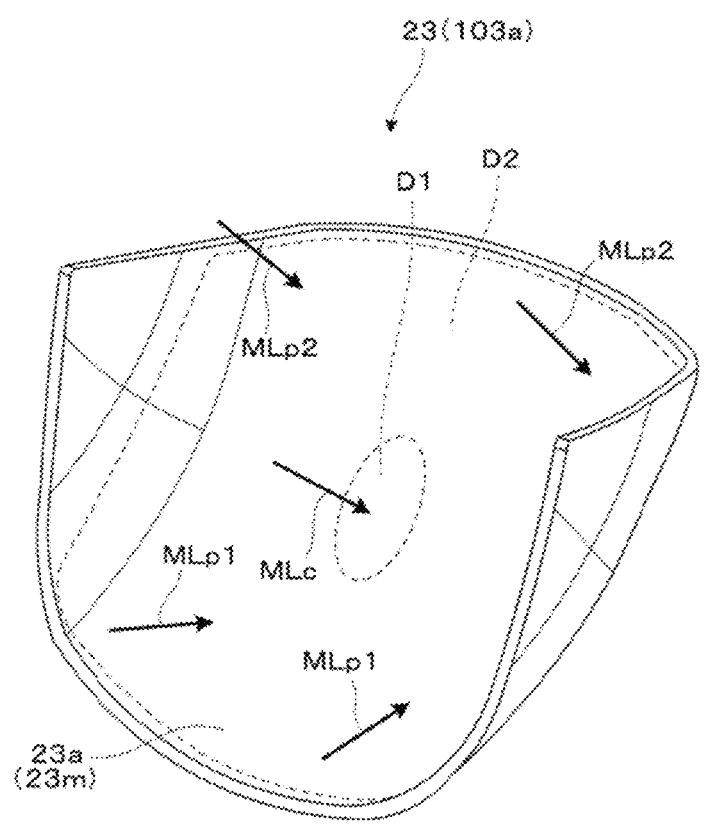
FIG. 3 is an external perspective view illustrating an example of a combiner (a see-through mirror).

Also, as illustrated in FIGS. 2 and 3, in the see-through mirror 23 which is an optical member, a range in which the light ray MLc is incident is referred to as a first region D1, and a range in which the light rays MLp1 and MLp2 are incident is referred to as a second region D2. In other words, of the image (the virtual image) to be seen, a range through which component light corresponding to the center angle of view passes is the optical axis AX illustrated in FIG. 2 and its vicinity, that is, the first region D1 which is the center side, and the peripheral side of the first region D1 is the second region D2. That is, the see-through mirror 23 having a curved surface shape forms the exit pupil at the pupil position PP by a component reflected in the first region D1 and a component reflected in the second region D2.

Here, as illustrated in a partially enlarged view of FIG. 2, a film thickness d in the first region D1 of the reflective film 23m is greater than a film thickness d' in the second region D2. That is, there is a relationship d>d'. A difference between the film thicknesses is due to a shape of the see-through mirror 23, that is, the combiner 103a and the formation of the reflective film 23m.

Various methods can be considered as a method of forming the reflective film 23m, that is, a method of fabricating the see-through mirror 23 (the combiner 103a), and a dielectric multilayer film can be formed by, for example, a vacuum vapor deposition method.

Hereinafter, an example in which the reflective film 23m in the see-through mirror 23 is formed will be described with reference to a concept diagram illustrated in FIG. 4. As illustrated, first, a base material MM (corresponding to the plate-shaped body 23b) that will become the see-through mirror 23 is fixed in a vacuum chamber CC by a jig (not illustrated) or the like, a film forming material (a vapor deposition source) DS is evaporated in the vacuum chamber CC and is attached to a surface (an interface) SS of the base material MM to form a thin film, and thus the reflective film 23m is provided to form the see-through mirror 23.

In a case in which the see-through mirror 23 is fabricated as described above, variations in the film thickness of the reflective film 23m occur easily at the center and the periphery of a portion that will become the reflective film 23m due to the angular relationship between the vapor deposition source DS and the surface SS of the base material MM. Specifically, in a center portion CP in a direction in which it faces the vapor deposition source DS which evaporates in a direction indicated by an arrow DD1 and a peripheral portion EP which is at an angle with respect to the arrow DD1 compared to the center portion CP, as shown in a partially enlarged view in the drawing, a thickness of the deposit SE that will become the reflective film 23m is thicker in the center portion CP than in the peripheral portion EP (the peripheral portion EP is thinner than the center portion CP). Here, a posture of the base material MM is adjusted so that the center portion CP corresponds to the first region D1 and the peripheral portion EP corresponds to the second region D2. In this case, for the center portion CP (corresponding to the first region D1), a direction axis LL which is normal to the center portion CP indicated by a dot-dash line is parallel with the direction indicated by the arrow DD1. Here, in a case in which the center portion CP is seen as facing the vapor deposition source DS and having no inclination, when an angle formed between a normal line with respect to the peripheral portion EP (corresponding to the second region D2) and the direction axis LL which is a normal line of the center portion CP is referred to as an angle θ, a difference in film thickness corresponding to the angle θ occurs between the center portion CP and the peripheral portion EP. Numerically, in the see-through mirror 23 fabricated after the reflective film 23m is formed, when the film thickness of the reflective film 23m in the first region D1 is referred to as d, the film thickness of the reflective film 23m in the second region D2 is referred to as d', and an inclination angle of the second region D2 with respect to the first region D1 is the angle θ as described above, the following Equation (1) is satisfied:

$$d' = d \cos \theta \qquad (1).$$

Here, when the film thickness of the reflective film 23m is thinner than an expected film thickness, it is considered that reflectivity characteristics of the reflective film 23m at a relevant location are shifted to a shorter wavelength side than an expected wavelength band according to an amount of thinning. Therefore, for the reflective film 23m formed as described above, for example, assuming that the film thickness d in the first region D1 is as expected but the film thickness d' in the second region D2 is thinner than an expected film thickness, the reflectivity characteristics in the second region D2 are shifted to a shorter wavelength side than an expected wavelength band. As a result, there is a possibility of a situation in which the desired reflectivity characteristics in the second region D2 cannot be obtained on the long wavelength side of the wavelength band of the image light ML. To avoid such a situation, in the image display apparatus 100 according to the embodiment, since the reflective film 23m is formed in the see-through mirror 23 to have the reflectivity characteristics corresponding to a longer wavelength side than a wavelength band of the image light ML, even in the case in which a location at which the reflective film 23m is thinner than an expected film thickness occurs on the reflective film 23m and the reflectivity characteristics at the location are shifted to a shorter wavelength side than an expected wavelength band, the desired reflectivity characteristics can also be obtained for the wavelength band of the image light ML in the location. In other words, even in the case in which the difference (the difference in film thickness) between the film thickness d in the first region D1 and the film thickness d' in the second region D2 occurs in the reflective film 23m, differences in the reflectivity characteristics caused by the difference in film thickness are suppressed, color unevenness in reflection of the image light ML at the reflective film 23m is reduced, and good image formation is possible.

Figure 4:
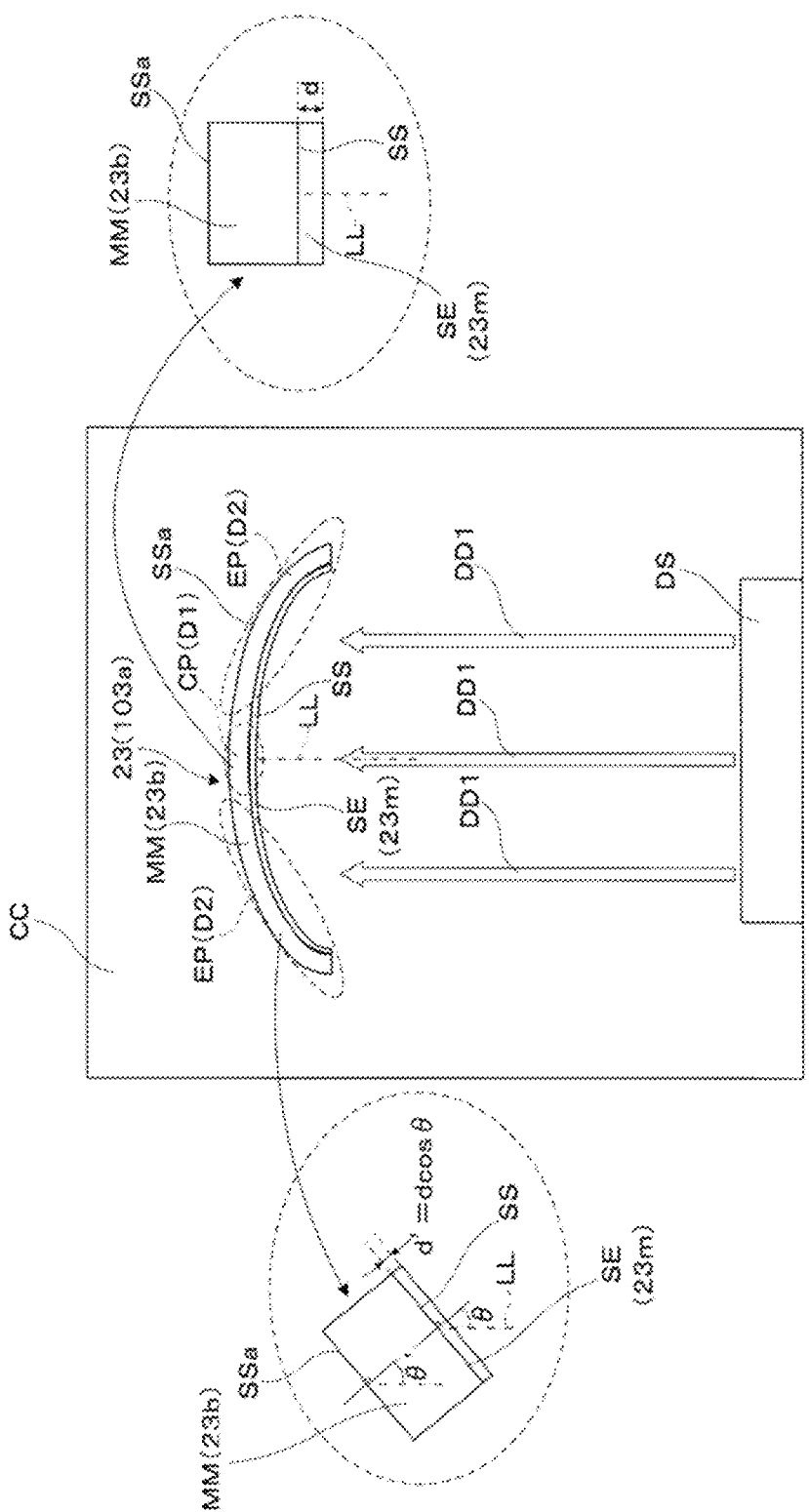
FIG. 4 is a conceptual view illustrating an example of film formation of a reflective film in a combiner.

For example, in FIG. 4, assuming that the angle formed between the normal line of the peripheral portion EP corresponding to the second region D2 and the direction axis LL corresponding to the normal line of the center portion CP is about θ=30°, the difference in the film thickness d' with respect to the center portion CP corresponding to the first region D1 is assumed to be about 0.87 times the film thickness d from Equation (1). In this case, the desired reflectivity characteristics can be obtained not only in the first region D1 but also in the second region D2 by widening the wavelength band, in which the reflectivity characteristics are maintained in the case in which the expected film thickness is formed, in advance by about 13% toward the longer wavelength side than the wavelength band of the image light ML, In the drawings, the inclination angle θ is an angle of the surface (the interface) SS of the base material MM, that is, the vapor deposition surface, but the present disclosure is not limited thereto, and for example, when the base material MM (the plate-shaped body 23b) has a substantially uniform thickness, as shown in the drawing, it is also conceivable to use an angle θ' on an outside surface SSa of the base material MM (the plate-shaped body 23b) as a reference for measuring an angle.

Table 1 below is a data table illustrating a specific example of the reflective film 23m made of a dielectric multilayer film.

TABLE 1

| LAYER | MATERIAL | REFRACTIVE INDEX | FILM THICKNESS nm |
|---|---|---|---|
| BASE MATERIAL | RESIN | 1.52 | |
| 1 | SiO2 | 1.46 | 18.9 |
| 2 | TiO2 | 2.40 | 12.5 |
| 3 | SiO2 | 1.46 | 76.7 |
| 4 | TiO2 | 2.40 | 25.7 |
| 5 | SiO2 | 1.46 | 114.2 |
| 6 | TiO2 | 2.40 | 13.0 |
| 7 | SiO2 | 1.46 | 105.9 |
| 8 | TiO2 | 2.40 | 86.7 |
| 9 | SiO2 | 1.46 | 110.1 |
| 10 | TiO2 | 2.40 | 65.9 |
| 11 | SiO2 | 1.46 | 65.0 |
| MEDIUM | ATMOSPHERE | 1.00 | |

As shown in Table 1, in one example herein, the reflective film 23m is formed of a dielectric multilayer film having an 11-layer structure constituted by a combination of SiO2-TiO2.

Figure 5:
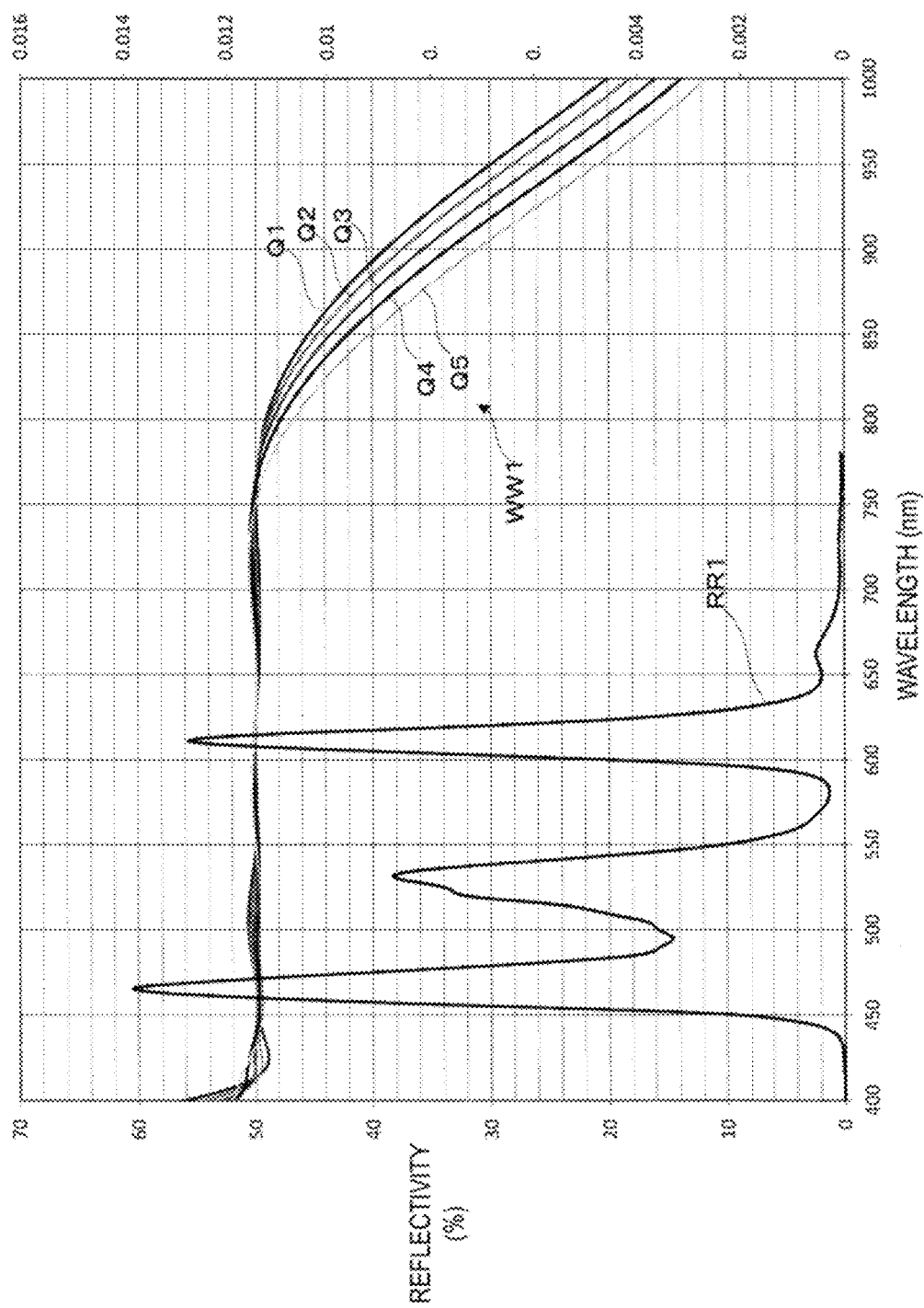
FIG. 5 is a graph for describing an example of reflectivity characteristics of a reflective film in a first region.

Hereinafter, a specific example of the embodiment will be described with reference to FIG. 5 and the like. FIG. 5 is a graph for describing an example of the reflectivity characteristics of the reflective film 23m in the first region D1. In other words, FIG. 5 illustrates the reflectivity characteristics when the reflective film 23m is formed with a film thickness shown in Table 1 upon formation of the reflective film 23m.

In the drawing, a horizontal axis indicates the wavelength band of light (unit: nm), and a vertical axis indicates the reflectivity of light (unit: %).

First, a curved line RR1 indicates a wavelength characteristic (a spectrum of the light source) in a light source (here, an OLED is employed). In other words, the curved line RR1 corresponds to the wavelength band of the image light ML emitted from the image light emitting unit 102a. In this case, in the wavelength band of the image light ML, a usage region on the long wavelength side is up to about 650 nm. In other words, in this case, the reflectivity characteristics of the reflective film 23m are required to be maintained in a desired state up to about 650 nm.

On the other hand, curved lines Q1 to Q5 in the drawings illustrate reflection characteristics for each angle of incidence of light with respect to the reflective film 23m. Specifically, for example, the curved line Q1 is a curved line indicating the reflectivity for each wavelength of the component incident on the first region D1 of the reflective film 23m at an angle of incidence of 20°. Similarly, the curved line Q2 indicates the reflectivity characteristic at an angle of incidence of 25°, the curved line Q3 indicates the reflectivity characteristic at an angle of incidence of 30°, the curved line Q4 indicates the reflectivity characteristic at an angle of incidence of 35°, and the curved line Q5 indicates the reflectivity characteristic at an angle of incidence of 40°. In other words, the overall WW1 of the curved lines Q1 to Q5 indicates the reflection characteristics (the reflectivity characteristics) of the reflective film 23m for light incident at an angle of incidence of 20° to 40°. Assuming that the image light ML is incident on the first region D1 in a certain angular range, the image light ML corresponds to light having a range of angles as described above. In addition, here, in order to cause the see-through mirror 23 to function as a half mirror, it is assumed that the reflective film 23m is maintained at a reflectivity of about 50%.

In the above case, the curved lines Q1 to Q5 satisfy the necessary requirements for up to about 650 nm on the long wavelength side of the wavelength band of the image light ML as long as they have a reflectivity of about 50%. However, as will be described below with reference to FIG. 6, in view of the fact that the film thickness of the reflective film 23m in the second region D2 is not limited to that in Table 1, the curved lines Q1 to Q5 maintain a reflectivity of about 50% in a wide range (for example, a range up to 780 nm) for the longer wavelength side than 650 nm. As described above, the reflectivity characteristic in the first region D1 of the reflective film 23m corresponds to a wavelength band (of a range up to 780 nm or greater) which is 1.2 times or more wider on the long wavelength side than a usage wavelength band of the image light ML emitted from the image light emitting unit 102a.

Figure 6:
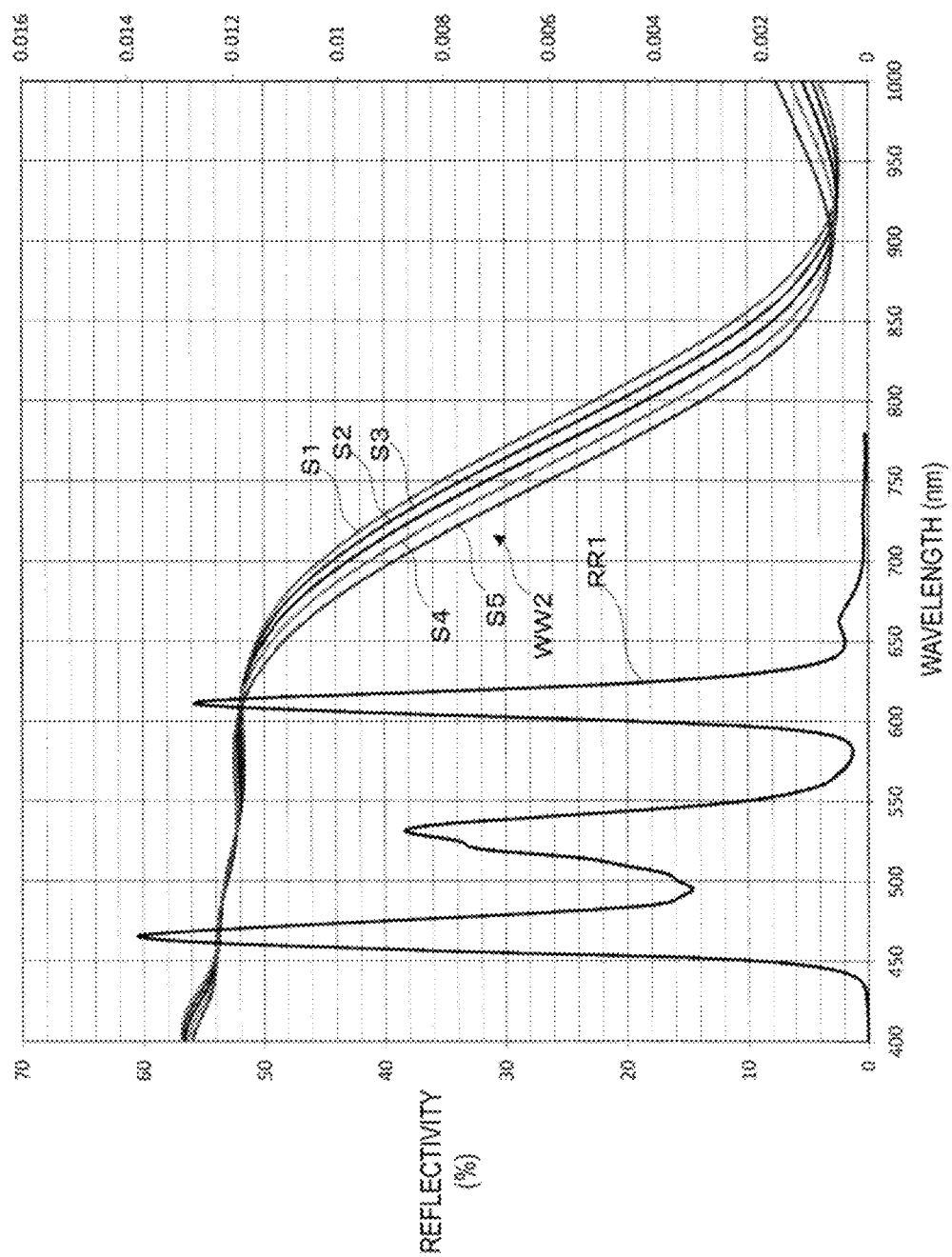
FIG. 6 is a graph for describing an example of reflectivity characteristics of a reflective film in a second region.

FIG. 6 is a graph for describing an example of the reflectivity characteristics of the reflective film 23m in the second region D2. In other words, FIG. 6 illustrates the reflectivity characteristics of the reflective film 23m of which the film thickness is thinner than the film thickness shown in Table 1 upon the formation of the reflective film 23m. More specifically, in one example herein, the reflectivity characteristics of the reflective film 23m in the case in which the film thickness is 20% thinner is illustrated in comparison to the case shown in Table 1 or FIG. 5 above. In the drawing, a horizontal axis indicates the wavelength band of light (unit: nm), and a vertical axis indicates the reflectivity of light (unit: %).

Curved lines S1 to S5 in the drawing indicate reflection characteristics for each angle of incidence of light with respect to the reflective film 23m. Specifically, for example, the curved line S1 is a curved line indicating the reflectivity for each wavelength of the component incident on the second region D2 of the reflective film 23m at an angle of incidence of 20°. Similarly, the curved line S2 indicates the reflection characteristics at an angle of incidence of 25°, the curved line S3 indicates the reflection characteristics at an angle of incidence of 30°, the curved line S4 indicates the reflection characteristics at an angle of incidence of 35°, and the curved line S5 indicates the reflection characteristics at an angle of incidence of 40°. In other words, the overall WW2 of the curved lines S1 to S5 indicates the reflection characteristics (the reflectivity characteristics) of the reflective film 23m for light incident at an angle of incidence of 20° to 40°.

In this case, the curved lines S1 to S5 satisfy the necessary requirements for up to about 650 nm on the long wavelength side of the wavelength band of the image light ML. In other words, the reflective film 23m is maintained at a reflectivity of about 50%, and the see-through mirror 23 can function as a half mirror. In the case shown in FIG. 6, since the film thickness of the reflective film 23m is thinner than the expected film thickness (the film thickness shown in Table 1), it can be seen that the range in which the reflectivity of 50% is maintained, that is, the range in which the reflection characteristics are maintained is shifted to the short wavelength side as a whole when the overall WW2 of the curved lines S1 to S5 is compared with the overall WW1 of the curved lines Q1 to Q5 of FIG. 5. However, as described above, the reflection characteristics (the reflectivity characteristic) in the film thickness shown in Table 1 are set to correspond to a wavelength band which is wider than the wavelength band (for example, 650 nm on the long wavelength side) of the image light ML emitted from the image light emitting unit 102a (for example, the reflectivity is maintained up to about 750 nm). As a result, as in the second region D2, even in the case in which the film thickness of the reflective film 23m becomes thinner and a region in which the reflection characteristics (the reflectivity characteristics) are shifted to the short wavelength side occurs, the reflection characteristics (the reflectivity characteristics) can be maintained at the wavelength band (for example, 650 nm on the long wavelength side) required for reflection of the image light ML, degradation of the image can be suppressed, and the image can be maintained preferably.

Hereinafter, a conventional example for the embodiment will be considered with reference to FIG. 7 and the like. In the reflective film 23m having characteristics illustrated in the graph of FIG. 7 as a conventional example, when the difference in film thickness occurs, color unevenness may be generated. Specifically, in the graph of FIG. 7, the overall WW1 of the curved lines Q1 to Q5 and the overall WW2 of the curved lines S1 to S5 show the reflection characteristics for each angle of incidence of light with respect to the reflective film 23m, as in the cases of FIGS. 5 and 6. That is, in the drawing, a horizontal axis indicates the wavelength band of light (unit: nm), a vertical axis indicates the reflectivity as a spectral characteristic (the reflection characteristic) of the light (unit: %), and the overall WW1 indicates the reflection characteristics (the reflectivity characteristics) at the expected film thickness, and the overall WW2 indicates the reflection characteristics (the reflectivity characteristics) when the film thickness is 20% thinner than the expected film thickness.

In the above case, in the overall WW1, a reflectivity of about 50% is maintained up to a range of, for example, 650 nm, but in the overall WW2, a shift to the short wavelength side occurs, and the reflectivity is maintained only to about 600 nm. In this case, a reduction in reflection occurs on the long wavelength side, that is, in a red wavelength band, color unevenness occurs, and there is a possibility that deterioration of the image may occur.

Figure 7:
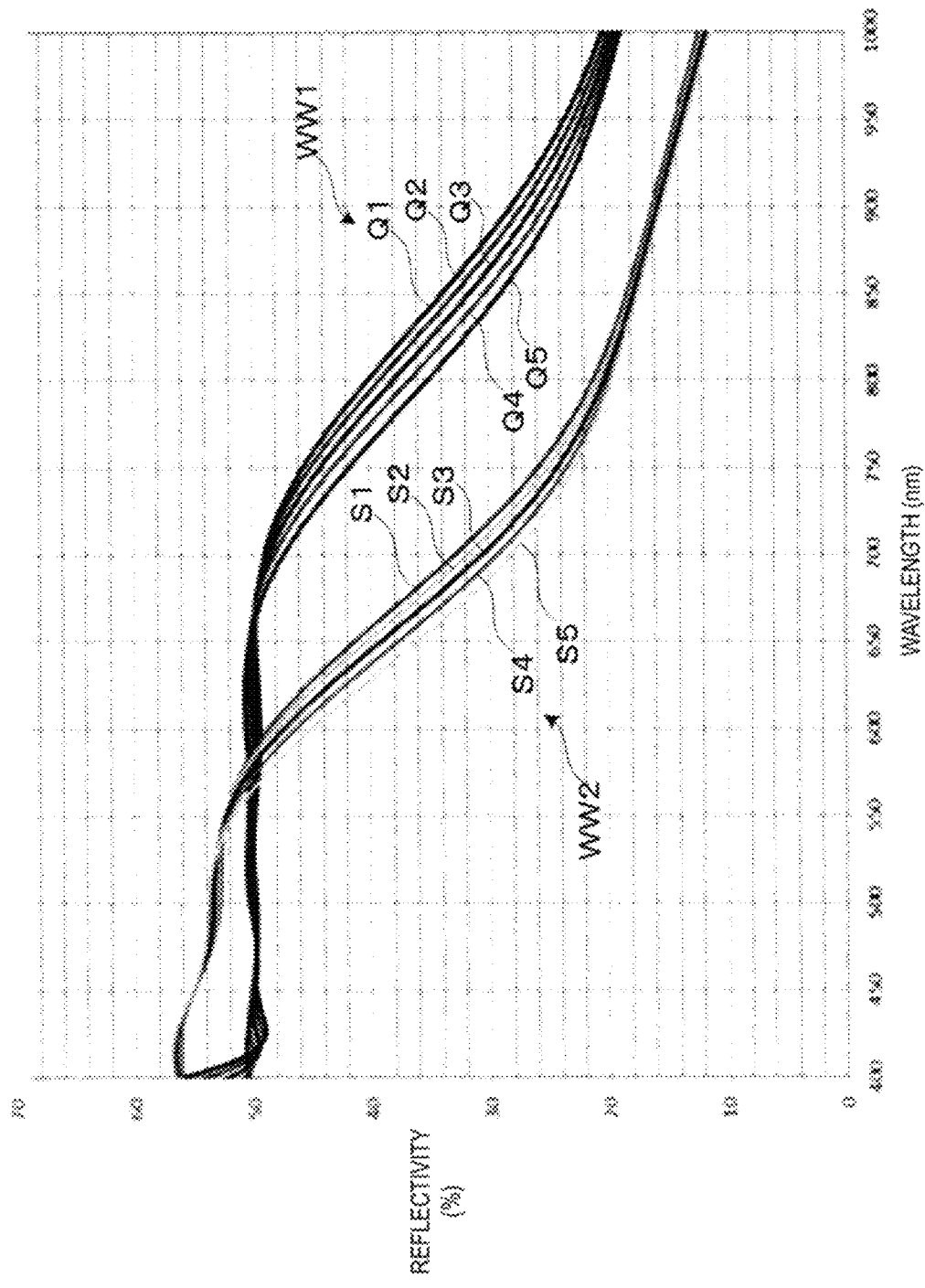
FIG. 7 is a graph for describing reflectivity characteristics of a reflective film of a conventional example.
Figure 8:
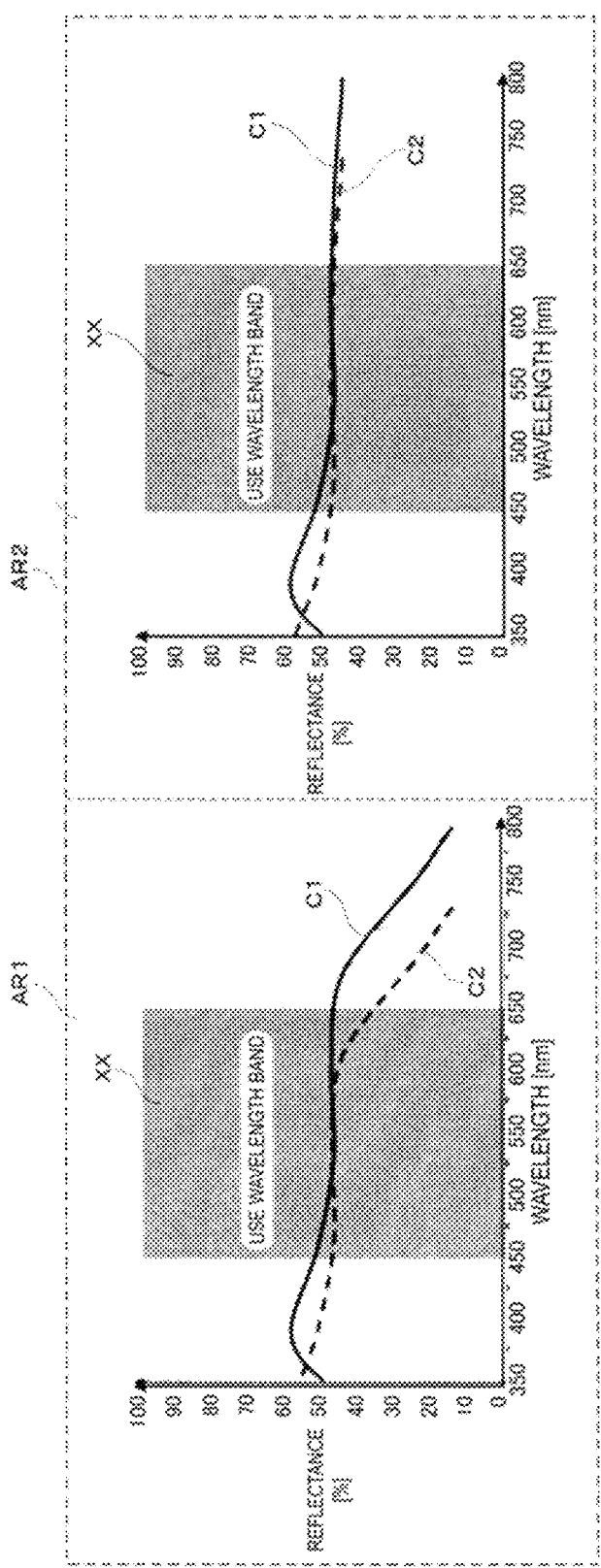
FIG. 8 is a conceptual graph for comparing the reflectivity characteristics of the reflective film of the conventional example and the reflectivity characteristic of the reflective film in the first embodiment.

FIG. 8 is a conceptual graph for comparing the reflectivity characteristics of the reflective film of the conventional example as illustrated in FIG. 7 and the reflectivity characteristics of the reflective film in the embodiment. In the drawing, a horizontal axis indicates the wavelength band of light (unit: nm), and a vertical axis indicates the reflectivity as a spectral characteristic (a reflection characteristic) of light (unit: %). For example, this corresponds to an average value of those illustrated in FIGS. 5 to 7.

In FIG. 8, a graph of a region Ar1 indicates the reflectivity characteristics of the reflective film of the conventional example, and a graph of a region Ar2 indicates the reflectivity characteristics of the reflective film 23m in the embodiment. A curved line C1 shown by a solid line in the drawing indicates the spectral characteristics of light in the film thickness expected as in the first region D1, and a curved line C2 shown by a broken line in the drawing indicates the spectral characteristics of light at a film thickness which is thinner than the film thickness expected as in the second region D2. Furthermore, the wavelength band used as the image light ML is indicated as a hatched range XX. As illustrated in the region AR1, and as described with reference to FIG. 7, in the conventional example, the curved line C1 maintains the desired spectral characteristics (the reflection characteristics) in a range XX but does not maintain the desired spectral characteristics (the reflection characteristics) in a wider range. Therefore, a curved line C2 in which a shift to the short wavelength side occurs cannot maintain the spectral characteristics (reflection characteristics) on the long wavelength side of the range XX. On the other hand, in the embodiment, as illustrated in the region AR2, since the desired spectral characteristics (the reflection characteristics) are maintained in a wider range with respect to the longer wavelength side than the range XX, the desired spectral characteristics (the reflection characteristics) are maintained in the range XX in both the curved line C1 and the curved line C2, even in the case in which the shift occurs.

As described above, the image display apparatus 100 as a virtual image display apparatus according to the embodiment includes the image light emitting unit 102a (the image light emitting unit 102b) configured to emit the image light ML, and the see-through mirror 23 (the combiners 103a and 103b) as an optical member having the reflective film 23m which reflects the image light ML, the see-through mirror 23 includes the first region D1 on which a light ray MLc corresponding to a center angle of view of the image light ML is incident, and the second region D2 on which light rays MLp1 and MLp2, which are different from the light ray MLc corresponding to the center angle of view of the image light ML, are incident, the film thickness d in the first region D1 of the reflective film 23m is thicker than the film thickness d' in the second region D2, and the reflective film 23m has the reflectivity characteristics corresponding to a wavelength band which is wider than the wavelength band of the image light ML emitted from the image light emitting unit 102a. In this case, since the first region D1 of the reflective film 23m has the reflectivity characteristics corresponding to a wide wavelength band on the longer wavelength side than the wavelength band of the image light ML emitted from the image light emitting unit 102a, even in the case in which the difference (the difference in film thickness) occurs between the film thickness d in the first region D1 and the film thickness d' in the second region D2, the difference in the reflectivity characteristics caused by the difference in film thickness can be suppressed, color unevenness in reflection of the image light ML at the reflective film 23m can be reduced, and thus preferable image formation is possible.

Second Embodiment

Hereinafter, an image display apparatus as a virtual image display apparatus according to a second embodiment will be described with reference to FIG. 9 and the like. Since the image display apparatus as one example of the image display apparatus according to the embodiment is a partially modified version of the image display apparatus 100 of the first embodiment and other configurations except the configuration of the dielectric multilayer film constituting the reflective film 23m are the same, for those with the same signs as those in other drawings for the overall configuration, detailed drawings and descriptions are omitted and, as necessary, the contents described with reference to other drawings will be incorporated as appropriate.

Table 2 below is a data table illustrating an example of a reflective film 23m made of a dielectric multilayer film in the embodiment.

TABLE 2

| LAYER | MATERIAL | REFRACTIVE INDEX | FILM THICKNESS nm |
|---|---|---|---|
| BASE MATERIAL | RESIN | 1.52 | |
| 1 | SiO2 | 1.46 | 45.0 |
| 2 | TiO2 | 2.40 | 14.4 |
| 3 | SiO2 | 1.46 | 55.0 |
| 4 | TiO2 | 2.40 | 70.3 |
| 5 | SiO2 | 1.46 | 10.2 |
| 6 | TiO2 | 2.40 | 63.6 |
| 7 | SiO2 | 1.46 | 116.2 |
| 8 | TiO2 | 2.40 | 9.4 |
| 9 | SiO2 | 1.46 | 104.5 |
| 10 | TiO2 | 2.40 | 74.9 |
| 11 | SiO2 | 1.46 | 107.5 |
| 12 | TiO2 | 2.40 | 69.2 |
| 13 | SiO2 | 1.46 | 62.1 |
| MEDIUM | ATMOSPHERE | 1.00 | |

As shown in Table 2, in one example herein, the reflective film 23m is formed of a dielectric multilayer film having a 13-layer structure constituted by a combination of $SiO_2$—$TiO_2$.

Figure 9:
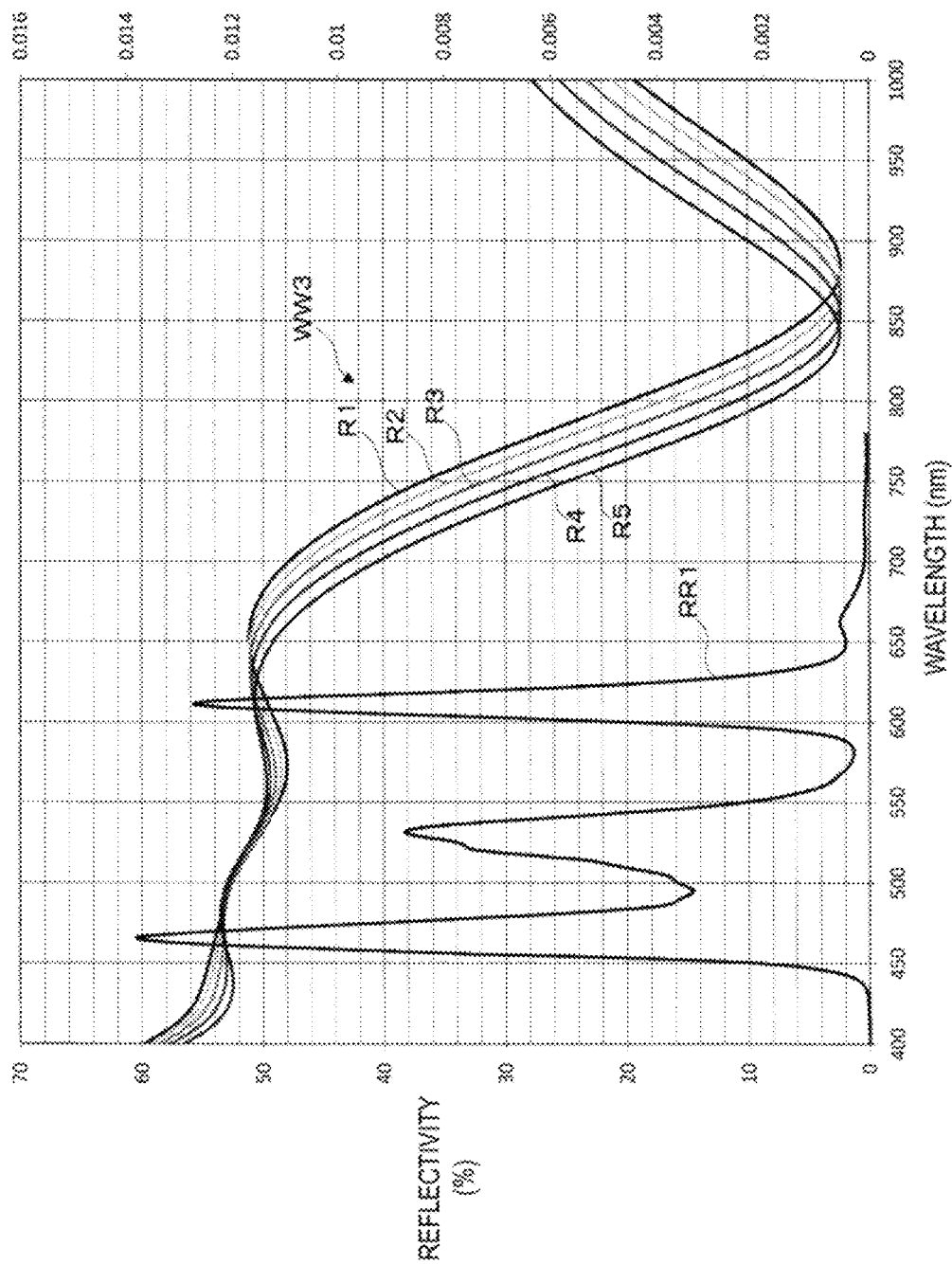
FIG. 9 is a graph for describing an example of the reflectivity characteristics of the reflective film in the second region as an example of an image display apparatus according to a second embodiment.
Figure 10:
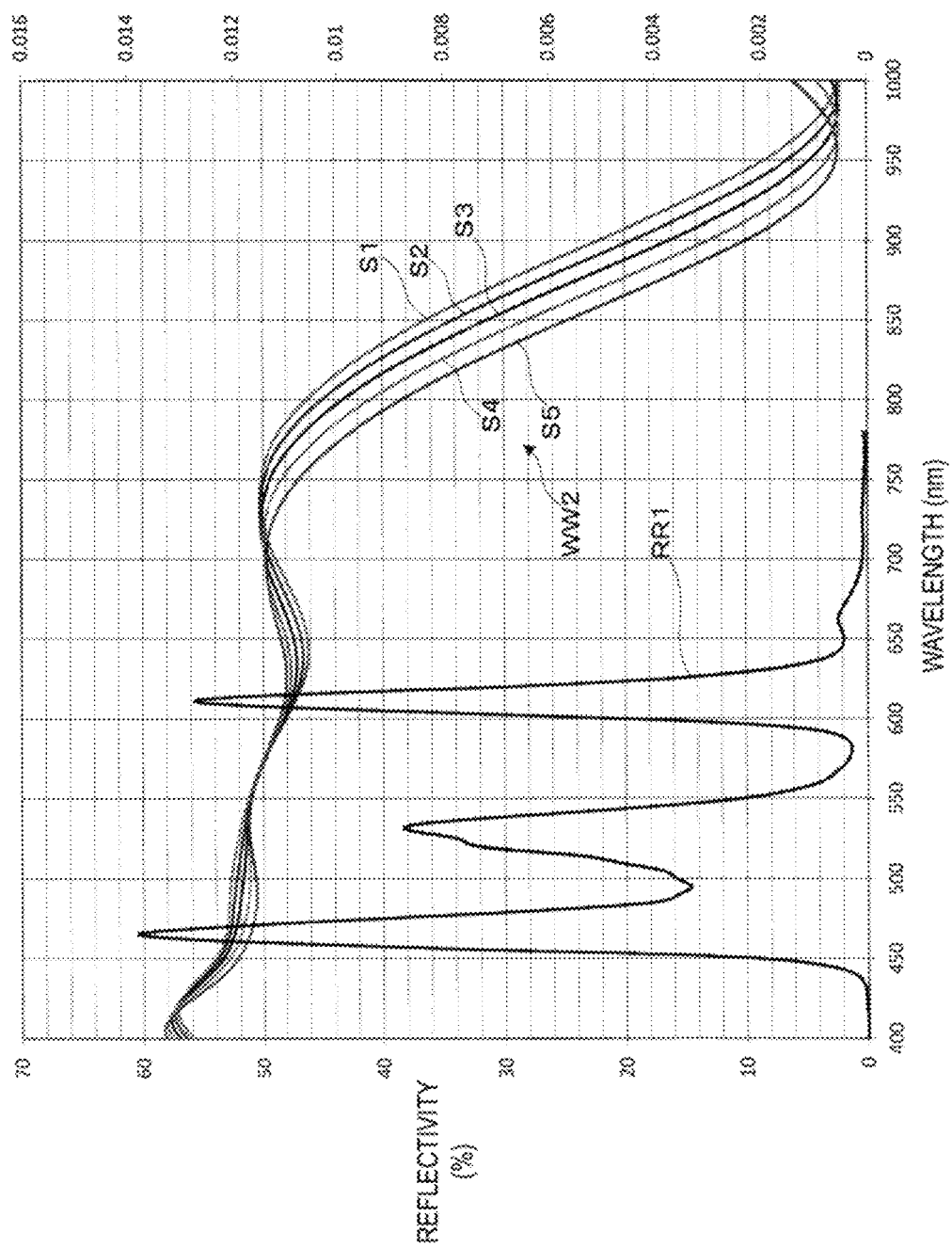
FIG. 10 is a graph for describing another example of the reflectivity characteristics of the reflective film in the second region.

FIGS. 9 and 10 are graphs for describing an example of the reflectivity characteristics of the reflective film 23m in the second region D2 of the see-through mirror 23 of the image display apparatus 100 according to the embodiment, and is a diagram corresponding to FIG. 6. FIG. 9 illustrates the reflectivity characteristics when the film thickness of the reflective film 23m is thinner by 30% with respect to the configuration shown in Table 2 as an example of the second regions D2, and FIG. 10 illustrates the reflectivity characteristics when the film thickness of the reflective film 23m is thinner by 20% as another example of the second regions D2. In other words, FIG. 9 illustrates a location in the second region D2 in which the angle θ (refer to FIG. 4) with respect to the first region D1 is larger, and FIG. 10 illustrates a location in the second region D2 in which the angle θ (refer to FIG. 4) is smaller than that in the case of FIG. 9.

Figure 11:
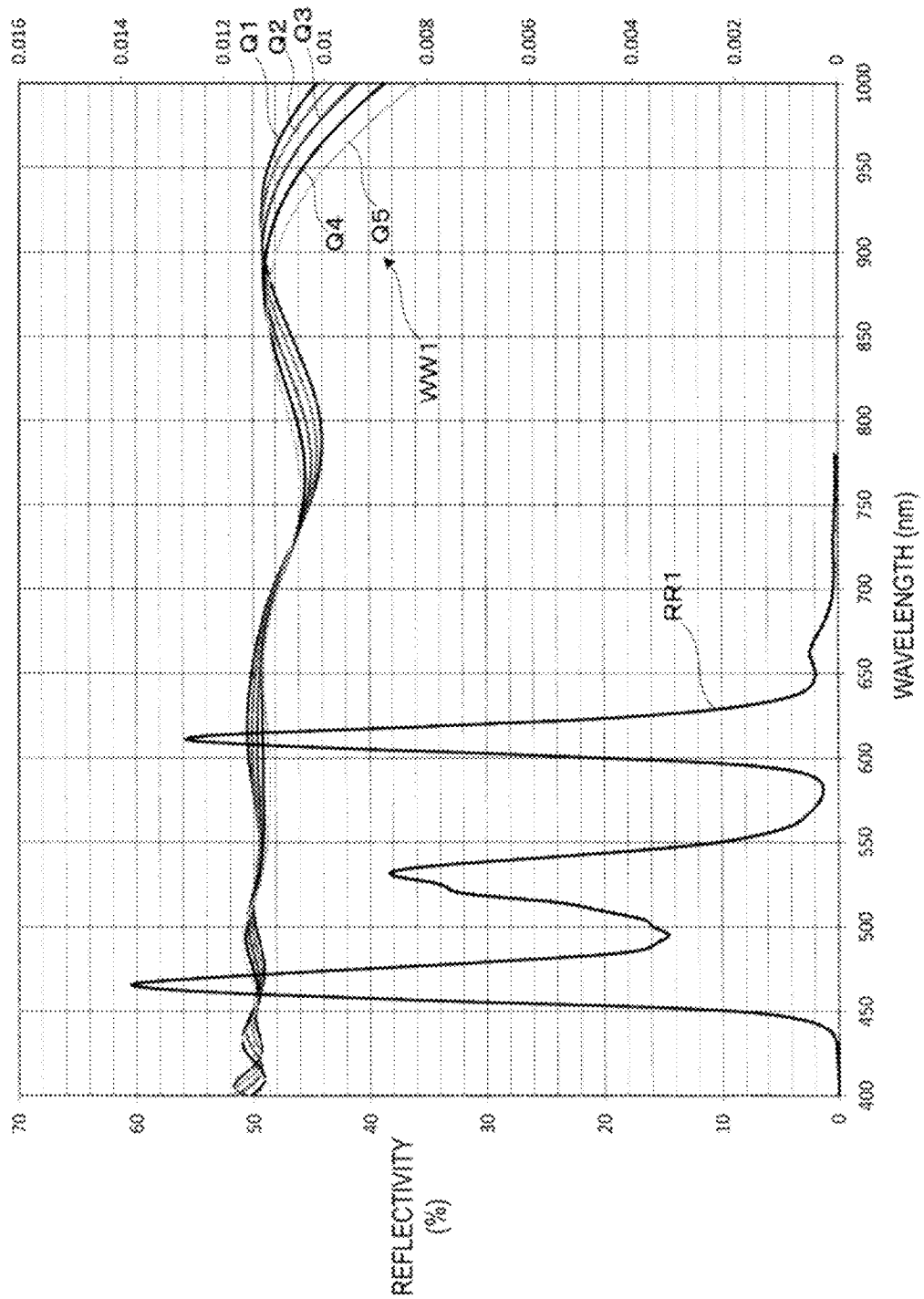
FIG. 11 is a graph for describing an example of the reflectivity characteristics of the reflective film in the first region.

Furthermore, FIG. 11 is a graph for describing an example of the reflectivity characteristics of the reflective film 23m in the first region D1 of the see-through mirror 23, and corresponds to FIG. 5. In other words, the reflectivity characteristics in a case of having the film thickness in the configurations shown in Table 2 above are illustrated.

In each of the drawings, a horizontal axis indicates the wavelength band of light (unit: nm), and a vertical axis indicates the reflectivity of light (unit: %).

In FIG. 9, curved lines R1 to R5 are same as those in other drawings. That is, the curved line R1 is a curved line indicating the reflectivity for each wavelength of a component incident on the second region D2 of the reflective film 23m at an angle of incidence of 20°, and similarly, the curved line R2 indicates the reflection characteristics at an angle of incidence of 25° and the curved line R3 indicates the reflection characteristics at an angle of incidence of 30°, the curved line R4 indicates the reflection characteristics at an angle of incidence of 35°, the curved line R5 indicates the reflection characteristics at an angle of incidence of 40°, and an overall WW3 thereof indicates the reflection characteristics (the reflectivity characteristics) of the light incident in an angle of incidence range of 20° to 40° in the reflective film 23m. Curved lines S1 to S5 in FIG. 10 and curved lines Q1 to Q5 in FIG. 11 are the same as those in FIGS. 6 and 5, and thus descriptions thereof will be omitted.

In the embodiment, as illustrated in FIG. 9, even in the case in which the film thickness of the reflective film 23m becomes thinner, and thus a region in which the reflection characteristics (the reflectivity characteristics) are shifted to the shorter wavelength side occurs, the reflection characteristics (the reflectivity characteristics) at a wavelength band (for example, 650 nm on the long wavelength side) required for reflection of the image light ML can be maintained, degradation of the image can also be suppressed, and the image can be maintained preferably. In addition, in the case of the embodiment, as illustrated in FIG. 10, even in the case in which the film thickness of the reflective film 23m becomes thin to a certain degree, and thus a region in which the reflection characteristics (the reflectivity characteristics) are shifted to the short wavelength side to a certain extent occurs, the reflection characteristics (the reflectivity characteristics) are maintained. In one example illustrated in FIG. 10, the reflection characteristics (the reflectivity characteristic) are maintained in a range (for example, up to about 750 nm) wider than 650 nm on the long wavelength side. Furthermore, as illustrated in FIG. 11, in the first region D1, the reflective film 23m maintains the reflection characteristics (the reflectivity characteristics) up to about 900 nm. That is, the reflective film 23m has the reflectivity characteristics corresponding to a wavelength component of up to 900 nm in the first region D1.

In the embodiment as well, the reflective film 23m has the reflectivity characteristics corresponding to a wavelength band which is wider than a wavelength band of the image light ML emitted from each of the image light emitting units 102a and 102b, a difference in the reflectivity characteristics caused by the difference in film thickness of the reflective film 23m is suppressed, color unevenness in reflection of the image light ML at the reflective film 23m can be reduced, and thus preferable image formation is possible. In particular, the embodiment has the reflectivity characteristics corresponding to a wavelength component of up to 900 nm in the first region D1, preferable image formation is maintained correspondingly even in the case in which the film thickness of the reflective film 23m is thinner than the expected film thickness by 30% (for example, the angle θ is about 50°).

MODIFIED EXAMPLES AND OTHERS

The present disclosure is described according to the above-described embodiments, but the present disclosure is not limited to the above-described embodiments. The present disclosure may be carried out in various modes without departing from the gist of the present disclosure, and, for example, the following modifications may be carried out.

In the above description, since the shape of the see-through mirror 23 (the combiners 103a and 103b), which is an optical member having the reflective film 23m, is an off-axis optical system, it is conceivable that the optical surface thereof may include a free curved surface, or at least some of the optical surfaces may be replaced with an aspheric surface or a spherical surface, and thus as for the shape of the first region D1 and the second region D2, that is, the angle θ, various things can be considered. In this case, the difference in film thickness which occurs is not uniform and differs from location to location in accordance with the curved surface shape. However, the present disclosure is not limited to such an aspect, and for example, the present disclosure can be applied to an optical member having an overall shape which is spherical.

Furthermore, in the above description, as an example of the formation of the reflective film 23m, the film formed by the vacuum vapor deposition method is illustrated, but the present disclosure is not limited thereto, and it is conceivable to apply the present disclosure according to the difference in film thickness which occurs even in the case in which the film is formed by various methods such as sputtering.

In addition, in the above description, the example in which the reflective film 23m is made of the dielectric multilayer film has been described, but the present disclosure is not limited thereto, and, for example, it is conceivable that the reflective film 23m is formed by interposing a metal film in the dielectric multilayer film. In addition, in accordance with the expected range or the like for the angular range of incident light, a material other than the material described above may be used for the configuration of the dielectric multilayer film, and the number of layers may be other than that described above.

In addition, in the above description, although it is assumed that a difference in film thickness of, for example, about 20% or greater (about 30%) occurs in the reflective film 23m, the present disclosure is not limited thereto, and for example, when the maximum difference in film thickness is about 10%, the present disclosure may also be applied. In this case, it is thought that the shift to the short wavelength side is not so large as compared to the case of FIG. 6, FIG. 9, and the like, and it is conceivable that the reflective film 23m has reflective film characteristics in the first region D1 which corresponds to a wavelength band that is about 1.1 times wider than the wavelength band of the image light ML.

In addition, in the above description, the usage region on the long wavelength side of the image light ML is set to about 650 nm, and this value is used as one of the indexes for determining the wavelength band to be expanded, but in accordance with the wavelength characteristics (the spectrum of the light source) of the light source to be used and the like, not only the case of about 650 nm but also various values may be considered as an index.

In addition, the display element 11a is not limited to a spontaneous light emission type image light generation apparatus other than the above-described OLED display (the organic EL display) and the like, and may include an LCD and another light modulation element, and may form an image by illuminating the light modulation element with a light source (a light emitting part) such as a backlight. As the display element 11a, a liquid crystal on silicon (LCOS) (LCoS is a registered trademark), a digital micro-mirror device, or the like may be used instead of an LCD.

In addition, in the above description, although the image display apparatus 100 has a see-through type configuration in which an image as a virtual image is recognized and an outside image is visible or observed, it is also possible to apply the image display apparatus 100 in a configuration (so-called close type) in which visibility of the outside image is not involved.

In the above description, although the image display apparatus 100 for both eyes is used, one of parts for the right eye and the left eye can be omitted in the image display apparatus 100, and, in this case, a one-eye head-mounted display is obtained.

A virtual image display apparatus according to a specific aspect includes an image light emitting unit configured to emit image light, and an optical member having a reflective film which reflects the image light, the optical member includes a first region on which a light ray of the image light corresponding to a center angle of view is incident and a second region on which light rays of the image light which are different from the light ray corresponding to the center angle of view are incident, a film thickness in the first region of the reflective film is thicker than a film thickness in the second region, and the first region of the reflective film has reflectivity characteristics corresponding to a wavelength band which is wider toward the long wavelength side than a wavelength band of the image light emitted from the image light emitting unit.

In the above-described virtual image display apparatus, since the reflective film has, in the first region, the reflectivity characteristics corresponding to a wavelength band which is wider toward the long wavelength side than the wavelength band of the image light emitted from the image light emitting unit, even in the case in which a difference (a difference in film thickness) is formed between the film thickness in the first region and the film thickness in the second region, occurrence of a difference in reflectivity characteristics caused by the difference in film thickness can be suppressed, color unevenness in reflection of the image light at the reflective film can be reduced, and thus preferable image formation is possible.

In a specific aspect, the optical member has a curved surface shape and forms an exit pupil with a component reflected in the first region and a component reflected in the second region. In this case, a virtual image can be seen by the component reflected by the optical member.

In a specific aspect, the film thickness of the reflective film in the first region and the film thickness of the reflective film in the second region are expressed by the following Equation:

$$d' = d \cos \theta$$

wherein the film thickness in the first region of the reflective film is d, the film thickness in the second region of the reflective film is d', and the inclination angle of the second region with respect to the first region is θ. In this case, since the reflective film has reflectivity characteristics corresponding to the difference in film thickness generated in accordance with the difference in the inclination angle between the first region and the second region, preferable image formation is possible.

In a specific aspect, the reflectivity characteristics in the first region of the reflective film correspond to a wavelength band which is 1.2 times or more wider than the wavelength band of the image light emitted from the image light emitting unit. In this case, even in the case in which the reflectivity characteristics in the second region are different from those in the first region, the required reflectivity characteristics can be ensured.

In a particular aspect, the reflective film has, in the first region, the reflectivity characteristics corresponding to a wavelength component up to 900 nm. In this case, for example, even in the case in which the optical member has, for example, a shape in which the angle of the second region with respect to the first region is about 30°, the required reflectance characteristics can be maintained.

In a specific aspect, the reflective film has partial transmissive properties, and the optical member is a combiner which turns back some of the image light emitted from the image light emitting unit and transmits some of outside light in the reflective film. In this case, visibility by the so-called see-through is possible.

In a specific aspect, the reflective film is a dielectric multilayer film formed by a vacuum vapor deposition method. In this case, it is possible to form a film having sufficient compactness by a vacuum vapor deposition method, and the reflective film can be configured of the dielectric multilayer film according to various characteristics such as angular characteristics and the like.

In a specific aspect, the image light emitting unit emits a component of unpolarized light as the image light. In this case, in the fabrication of the reflective film, it is not affected by polarization separation characteristics.

What is claimed is:

1. A virtual image display apparatus comprising:
   an image light emitting unit that emits an image light; and
   an optical member having a reflective film which reflects the image light, the reflective film including a first region on which a light ray of the image light corresponding to a center angle of view is incident and a second region in which a light ray of the image different from the light ray corresponding to the center angle of view is incident, wherein:
   a film thickness in the first region of the reflective film is thicker than a film thickness in the second region,
   the first region of the reflective film has reflectivity characteristics corresponding to a wavelength band which is wider toward a long wavelength side than a wavelength band of the image light,
   the film thickness in the first region of the reflective film and the film thickness in the second region of the reflective film are expressed by the following equation:

$d' = d \cos \theta$, wherein the film thickness in the first region of the reflective film is d, the film thickness in the second region of the reflective film is d', and an inclination angle of the second region with respect to the first region is $\theta$.

2. The virtual image display apparatus according to claim 1, wherein
   the optical member has a curved surface shape, and
   the optical member forms an exit pupil with the image light reflected in the first region and the image light reflected in the second region, of the image light.

3. The virtual image display apparatus according to claim 1, wherein the reflectivity characteristics in the first region of the reflective film correspond to a wavelength band which is 1.2 times or more wider than a wavelength band of the image light emitted from the image light emitting unit of the reflective film.

4. The virtual image display apparatus according to claim 1, wherein the first region of the reflective film has reflectivity characteristics corresponding to a wavelength component up to 900 nm.

5. The virtual image display apparatus according to claim 1, wherein the reflective film reflects some of the image light and transmits the rest of the image light.

6. The virtual image display apparatus according to claim 1, wherein the reflective film is a dielectric multilayer film.

7. The virtual image display apparatus according to claim 1, wherein the image light emitting unit emits the image light of unpolarized light.

\* \* \* \* \*